Patented Mar. 17, 1942

2,276,619

UNITED STATES PATENT OFFICE 2,276,619

N-PHENYLALIPHATIC-DIHYDROXYPHENYL-ALIPHATIC AMINES

Fritz Kulz, Frankfort-on-the-Main, Germany, assignor to the firm Tropon-Werke Dinklage & Co., Cologne-Mulheim, Germany No Drawing. Application August 9, 1939, Serial No. 289,314. In Germany August 16, 1938

5 Claims. (Cl. 260—570.8)

This invention relates to new aliphatic-aromatic amines of the general formula

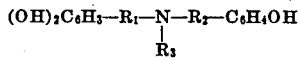

wherein $R_1$ and $R_2$ represent alkyl or alkylene radicles and $R_3$ represents hydrogen or an alkyl or alkylene radicle.

It is known that dihydroxyethylphenylamine, like adrenalin, causes vaso-constriction and thereby an increase of the blood pressure by stimulation of the sympathetic nerve terminations. Like adrenalin this compound and its derivatives, the ethyl or propyl substituted dihydroxyphenylethylamines, do not possess analgesic properties.

It has now been found that compounds which contain at the nitrogen, besides the dihydroxyphenylalkyl or the dihydroxyphenylalkyl radical, a monohydroxyphenylalkyl or monohydroxyphenylalkylene radicle and have the general formula

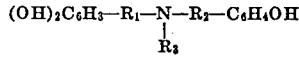

wherein $R_1$ and $R_2$ represent straight or branched alkyl or alkylene radicals and $R_3$ represents hydrogen or a straight or branched alkyl or alkylene radicle, possess analgesic properties if the following conditions are satisfied:

(1) In addition to the two hydroxyl groups in one benzene ring there must be only one hydroxyl group in the other benzene ring.

(2) The sum of the carbon atoms present in $R_1$ and $R_2$ must be at least 6.

The positions of the two hydroxyl groups in the benzene rings are immaterial, as is also their position with regard to each other. The position of the hydroxy group in the other benzene ring is as well immaterial.

$R_1$ and $R_2$ may be alkyl radicals with straight chains such as methyl, ethyl, propyl, butyl, pentyl, hexyl or alkyl radicals with branched chains such as isobutyl, isopentyl or tertiary pentyl, or alkylene radicals with straight chains such as propenyl, butenyl, pentenyl, hexenyl, or alkylene radicals with branched chains such as isobutenyl or branched pentenyls or hexenyls. The carbon atoms present in $R_1$ and $R_2$ may be divided between $R_1$ and $R_2$ as desired. Their total number however must be at least four and should preferably not exceed ten. The analgesic properties of these new compounds are, as has been found, within these limits the greater, the greater is the total number of carbon atoms contained in $R_1$ and $R_2$.

$R_3$ may represent hydrogen or an alkyl or alkylene radical. Preferably $R_3$ does not contain more than four carbon atoms.

Besides the two hydroxyl groups in one benzene ring and one further hydroxyl group in the other benzene ring, the two benzene rings may contain other substituents, such as hydrocarbon residues, for example straight or branched alkyl or alkylene radicals or alkoxy or alkylene dioxy radicals, whereby the analgesic properties in relation to the other properties can be influenced to a manifold degree.

The production of the new compounds can be effected by introducing a phenylalkyl or phenylalkylene radical into a primary or secondary monophenylalkylamine or monophenylalkyleneamine, the benzene ring of one of these two components having present therein two hydroxyl groups and the benzene ring of the other component having therein one more hydroxyl group.

Another way of producing these new compounds consists in converting the corresponding compounds in which at least one of the hydroxyl groups is esterified or etherified in known manner into compounds with free hydroxyl groups. The opening of the etherified or esterified hydroxyl groups can be effected in known manner, for example by heating the initial materials with dilute or concentrated mineral acids, such as hydrobromic acid or hydriodic acid or with aluminium halides, such as aluminium chloride or aluminium bromide or with phosphorus pentachloride or phosphorus pentabromide or in particular in the cases in which alkylene dihydroxy groups are present by heating with a mineral acid, such as hydrochloric acid or hydrobromic acid in the presence of substances which react easily with formaldehyde, such as phloroglycine or resorcinol.

The production of these initial materials with etherified or esterified hydroxyl groups which are to be split off can be effected according to known methods for the production of secondary or tertiary amines, for example by condensing aldehydes or ketones with amines and hydrogenating the Schiff's bases formed or by heating an amine and an aldehyde according to the Leuckart-Wallach process in the presence of formic acid or other easily oxidisable substances or by reacting together monophenylalkylamines or monophenylalkyleneamines with a phenylalkyl halide or a phenylalkylene halide, two hydroxyl groups being contained in the benzene ring of one of the two components, and one more hydroxyl group being contained in the benzene ring of the other component, of which three hydroxyl groups at least one is etherified or esterified.

EXAMPLES

1. *Production of α-methyl-β-3,4-dihydroxy-phenylethyl-α'-methyl-γ'-4'-hydroxyphenyl-propylamine*

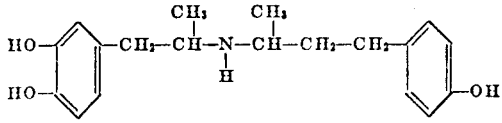

The compound obtained from 4-methoxy-benzyl-acetone and α-methyl-β-3,4-dimethoxy-phenylethylamine according to Leuckart-Wallach (boiling point of the base at 3 mm.=215° C. freezing point of the hydrochloride=169° C.) was heated with the thirty-fold quantity of constant boiling hydrobromic acid in a stream of carbon dioxide under reflux. By working up the reaction mixture obtained α-methyl-β-3,4-dihydroxy-phenylethyl-α'-methyl-γ'-4'-hydroxyphenyl-propylamine hydrobromide was obtained. This was a lacquer which could not be crystallised. The analysis after drying over $P_2O_5$ was:

|  | C | H | N |
|---|---|---|---|
| Calculated | 57,55 | 6,61 | 3,53 |
| Found | 57,75 | 6,75 | 3,40 |

2. *Production of (α-methyl-β-3,4-dioxyphenyl-ethyl)-(γ-4'-oxy-phenyl-propyl)amine*

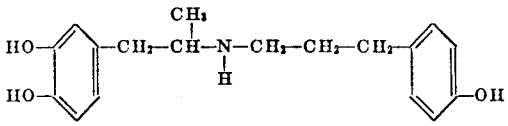

3.0 gms. of (α-methyl-β-3,4-dimethoxyphenyl-ethyl)-(γ-4'-methoxyphenyl-propyl)-amine (produced by catalytic hydrogenation of the Schiff's base from α-methyl-β-3,4-dimethoxy-phenylethylamine and γ-4'-methoxyphenyl-propylaldehyde) are heated with 50 ccm. of 48-percent hydrobromic acid for two hours in a stream of carbon dioxide. Then the hydrobromic acid is distilled off in the vacuum and the residue absorbed in 15 ccm. of water is, if desired, decolorated with animal charcoal. By adding hydrobromic acid the (α-methyl-β-3,4-dioxy-phenyl-ethyl)-(γ-4'-oxyphenyl-propyl)-amine-hydrobromide is crystallised out.

3. *Production of (α-methyl-β-3,4-dioxyphenyl-ethyl)-(α-methyl-β-4'-oxyphenylethyl)-amine*

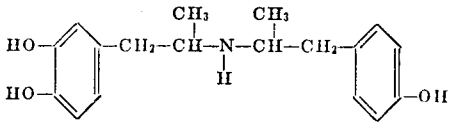

4.0 gms. of (α-methyl-β-3,4-dimethoxyphenyl-ethyl)-α-methyl-β-4'-methoxyphenylethyl)-amine-hydrochloride are heated with 50 ccm. constant boiling hydrobromic acid for two hours in a stream of carbon dioxide under reflux. Thereafter about ⅔ of the hydrobromic acid are distilled off in a vacuum. When cooling down slowly the hydrobromide of the (α-methyl-β-3,4-dioxyphenylethyl)-(α-methyl-β-4'-oxyphenyl-ethyl)-amines precipitates.

What I claim is:

1. An aliphatic-aromatic amine of the formula

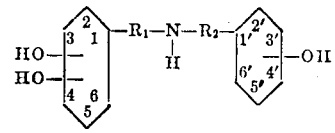

wherein $R_1$ and $R_2$ are hydrocarbon radicals selected from the group consisting of alkylene and unsaturated alkylene radicals, the total number of carbon atoms in such radicals being at least six.

2. α-methyl-β-3,4-dihydroxy-phenylethyl-α'-methyl-γ'-4'-hydroxyphenyl-propyl-amine.

3. (α-methyl-β-3,4-dihydroxy-phenylethyl)-(γ-4'-hydroxy-phenyl-propyl)-amine.

4. (α-methyl-β-3,4-dihydroxy-phenylethyl)-(α-methyl-β-4'-hydroxy-phenyl)-amine.

5. An aliphatic-aromatic amine of the formula

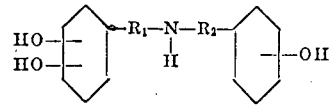

wherein $R_1$ and $R_2$ are hydrocarbon radicals selected from the group consisting of alkylene and unsaturated alkylene radicals, the total number of carbon atoms in such radicals being six to ten.

FRITZ KULZ.